(12) United States Patent
Bautz (10) Patent No.: US 11,135,531 B2
(45) Date of Patent: Oct. 5, 2021

(54) FILTER DEVICE

(71) Applicant: RT-FILTERTECHNIK GMBH, Friedrichshafen (DE)

(72) Inventor: Marco Bautz, Friedrichshafen (DE)

(73) Assignee: RT-FILTERTECHNIK GMBH, Friedrichshafen (DE)

( * ) Notice: Subject to any disclaimer, the term of this patent is extended or adjusted under 35 U.S.C. 154(b) by 136 days.

(21) Appl. No.: 16/607,806

(22) PCT Filed: Mar. 29, 2018

(86) PCT No.: PCT/EP2018/058055
§ 371 (c)(1),
(2) Date: Oct. 24, 2019

(87) PCT Pub. No.: WO2018/197149
PCT Pub. Date: Nov. 1, 2018

(65) Prior Publication Data
US 2020/0188820 A1   Jun. 18, 2020

(30) Foreign Application Priority Data
Apr. 27, 2017 (DE) ............... 10 2017 004 174.1

(51) Int. Cl.
*B01D 29/23* (2006.01)
*B01D 35/147* (2006.01)
*B01D 35/027* (2006.01)

(52) U.S. Cl.
CPC ......... *B01D 29/232* (2013.01); *B01D 35/027* (2013.01); *B01D 35/147* (2013.01);
(Continued)

(58) Field of Classification Search
CPC .......... B01D 2201/24; B01D 2201/291; B01D 2201/295; B01D 2201/301;
(Continued)

(56) References Cited

U.S. PATENT DOCUMENTS 10,005,010 B2 * 6/2018 Sann .................. B01D 29/96
10,617,981 B2 * 4/2020 Bautz ................. B01D 29/23
(Continued)

FOREIGN PATENT DOCUMENTS

DE    10 2007 014 813    10/2008
DE    10 2013 014 453    3/2015
(Continued)

OTHER PUBLICATIONS

International Search Report (ISR) dated Jun. 15, 2018 in International (PCT) Application No. PCT/EP2018/058055.

*Primary Examiner* — Terry K Cecil
(74) *Attorney, Agent, or Firm* — Wenderoth, Lind & Ponack, L.L.P.

(57) ABSTRACT

A filter device with a removable termination part (81; 82) and a housing (3) that receives a replaceable filter element (5) having two end caps (25,47). Between the end caps, a filter material (12) extends. A positioning device (65) is arranged between the termination part (81; 82) and one end cap (47). The positioning device positions the filter element (5) within the housing (3), at least when viewed in the circumferential direction of the filter element, in interaction with at least one corresponding positioning element (71) of the end cap (47).

20 Claims, 8 Drawing Sheets

(52) U.S. Cl.
CPC .. *B01D 2201/295* (2013.01); *B01D 2201/347* (2013.01); *B01D 2201/4053* (2013.01); *B01D 2201/4061* (2013.01); *B01D 2201/52* (2013.01)

(58) Field of Classification Search
CPC ...... B01D 2201/347; B01D 2201/4053; B01D 2201/4061; B01D 2201/4076; B01D 2201/52; B01D 29/23; B01D 29/232; B01D 35/027; B01D 35/0276; B01D 35/147

See application file for complete search history.

(56) References Cited

U.S. PATENT DOCUMENTS

| | | |
|---|---|---|
| 10,737,205 B2 * | 8/2020 | Benner ............... B01D 29/115 |
| 2008/0142426 A1 | 6/2008 | Greco et al. |
| 2012/0205300 A1 | 8/2012 | Piva et al. |
| 2016/0184746 A1 | 6/2016 | Bautz et al. |
| 2016/0310878 A1 | 10/2016 | Sann et al. |
| 2017/0028322 A1 | 2/2017 | Piva et al. |
| 2017/0030384 A1 | 2/2017 | Pastori |
| 2017/0296950 A1 | 10/2017 | Benner et al. |
| 2018/0117508 A1 * | 5/2018 | Paluszewski ........ B01D 29/603 |

FOREIGN PATENT DOCUMENTS

| | | |
|---|---|---|
| DE | 10 2015 005 136 | 10/2016 |
| EP | 3 124 092 | 2/2017 |
| WO | 2016/060991 | 4/2016 |

\* cited by examiner

FILTER DEVICE

FIELD OF THE INVENTION

The invention relates to a filter device having a removable end piece and having an enclosure, which holds a replaceable filter element having two end caps between which a filter material extends. The invention also relates to a filter element, which is provided in particular for a filter device of this type.

BACKGROUND OF THE INVENTION

Filter devices of this type are, as shown by way of example in DE 10 2007014813 A1, state of the art and are used in a variety of designs and embodiments for the filtration of process fluids, hydraulic fluids such as hydraulic oils, liquid fuels and lubricants, for the treatment of liquid media and the like. The reliability of such filter devices depends to a very large extent on the fact that, after replacement due to certain operating phases having elapsed, the installed or newly installed filter elements exactly fulfill the specifications, such as filter fineness, filter surface and other parameters. If the relevant filter device is equipped with an inappropriate filter element resulting in reduced or even no performance, which can result in malfunction or even damage, in particular in expensive technical equipment, it can cause significant economic losses.

SUMMARY OF THE INVENTION

In view of this, the invention addresses the problem of providing a filter device characterized by an improved functional reliability in a simple design.

According to the present invention, this problem is basically solved by a filter device having, as a significant feature of the invention, a positioning device arranged between the end part and one of the end caps. In conjunction with at least one corresponding positioning element of this end cap, the filter element, at least viewed in its circumferential direction, is positioned within the enclosure. Because the positioning, and thus, the establishing of the functional position of the filter element, depends on the presence of the positioning element matching the positioning at one of the end caps, the positioning device forms a safeguard, which ensures that the filter device can only be operated in conjunction with a filter element that is specifically suited and intended for the particular application.

In advantageous exemplary embodiments, the filter housing has at least one housing head, to which the enclosure is attached. The positioning device is arranged between one of the end caps and a housing cover of the housing head forming the end piece.

In exemplary embodiments in which the enclosure is attached to an annular body, mounted to a wall part of a tank storing fluid via a support ring, the positioning device can be arranged between one of the end caps and the tank cap forming the end piece.

In advantageous exemplary embodiments, the positioning device has a guide web, which engages with a guide channel arranged as a positioning element in one of the end caps and which is open towards the interior of the filter element. The tongue and groove engagement then formed between the positioning device and the end cap forms a type of key-lock system, which ensures that the filter element can only reach the functional position if the positioning device and the end cap geometrically match.

Advantageously, one of the end caps may have a guide ring on its inside, projecting on both sides beyond an abutment ring, to which one free, frontal end of the filter material is attached. The guide channel, the outer circumference of which is attached to the guide ring, preferably extends along the entire height of the outer circumference.

In particularly advantageous exemplary embodiments, the guide ring has a boundary surface projecting inwardly, in the direction of the interior of the filter element. The boundary surface interacts with at least one stepped boundary shoulder at an insert ring of the positioning device. The insert ring engages, preferably flush, in the operating state with the guide ring from the side of the filter head. A predeterminable axial distance is between the boundary surface and the boundary shoulder. While a rotational position of the filter element is predetermined by the tongue and groove engagement of the guide web of the positioning device with the guide channel of the end cap, the axial alignment of the filter element is performed with limited play. For a filter element, the other end cap is attached to the enclosure, and there are no special requirements for length tolerance.

Advantageously, the arrangement can be made such that the guide web at the insert ring protrudes outwardly in the direction of the guide channel from the insert ring and has an installation length that is shorter than the guide length provided for the guide web within the guide channel recessed in one of the end caps.

The positioning device can form an annular body, which bears the insert ring at the foot end and a head ring at the head end. The head end is at least partially in abutment with abutment parts of the housing head or the tank cap. For a housing cover detachably mounted to the housing head, the abutment parts can advantageously be formed at the head end.

In particularly advantageous exemplary embodiments, the arrangement is such that latching parts at the head ring of the annular body engage with the abutment parts of the housing head in a latching manner for the purpose of axially mounting the positioning device at the housing head. The assembly process can be performed easily and conveniently by closing the housing, while the positioning devices are latched to the abutment parts.

Advantageously, the arrangement may be such that at least one fastening bolt is provided between the head ring and abutment parts at the housing cover or at the tank cap. When the positioning device is securely attached by the bolt, the assembly process is particularly safe and comfortable.

Preferably, a plurality of, preferably three, spacing webs extend between the insert ring and the head ring. At least one spacing web bears the guide web projecting on the former's outside.

In particularly advantageous exemplary embodiments, one of the end caps, arranged concentrically to its guide ring, bears an outer ring for receiving a sealing ring. A further sealing ring is arranged between the head ring of the positioning device and the abutment parts of the housing cover.

Advantageously, the outer circumference of the filter element can be circular-cylindrical with the assigned one end cap. The inner circumference of the interior components, such as the filter material, can form a Reuleaux triangle. A filter material designed in that way can have a larger filter surface when installed in a given installation space than would be possible for a filter element having filter material with a circular cylindrical cross-sectional shape on its inner circumference.

In a filter material forming a hollow body, the arrangement is advantageously such that a connecting longitudinal seam of the preferably pleated filter material ends in a position aligned with the guide channel in one of the end caps.

The filter device can, as usual, have a bypass device, which is provided at the other end cap of the filter element. The bypass device opens onto the unfiltered side in the interior of the filter element.

By forming a filtrate chamber, the filter element can be accommodated in the enclosure at a predeterminable radial distance, which can be perforated at least in an axial longitudinal area adjacent to the bypass device. As a result, the filter device is suitable for installation in an appropriate fluid reservoir tank.

The other end cap, provided with the bypass device, may be firmly connected to the enclosure forming an attachment point. One of the end caps is attached to the housing head to form a floating bearing acting axially.

With particular advantage, a tag can be arranged in the peripheral area of one of the end caps, which tag can be read by an RFID sensor located at a wall part encompassing the relevant end cap. As is known, tags are data storage devices containing passive transponders. That data can be read by a state-of-the-art RFID sensor using radio waves. In the arrangement provided for by the invention, where the tag is located at the peripheral area of an end cap and where the scanner is located at an encompassing wall part, the distance between the data storage device and the reader can be minimized, permitting secure data transmission even at low electrical power. Data specifying the filter element can be stored in the data storage device. For instance, the data may permit the identification of only the chip of the filter element, for instance, in terms of its filter material, the media to be filtered, the dimensions, the manufacturing date and the like. In addition, data may be stored to allow identification of the individual filter element, such as a unique and preferably continuous serial number. If and to the extent to which the data are already defined during the production of the filter element, these data can be stored in a non-rewritable and read-only memory area of the data storage device such that they cannot be modified and in particular cannot be manipulated. Alternately or additionally, data that are generated only after the production of the filter element can also be stored.

In exemplary embodiments, in which one of the end caps is located within the housing head of the device, the sensor is advantageously arranged at the end cap encompassed by the housing head, and the RFID sensor is arranged at the housing head. If the RFID sensor is connected to a higher-level machine control of a hydraulic system, it can only be put into operation once the assigned filter element has been identified. In this way, the hydraulic system cannot be started or operated if a plagiarized product of poor quality is used, which could damage the hydraulic system.

The subject matter of the invention is also a filter element, in particular provided for a filter device according to the invention, having a filter material, which extends between two end caps, one of which has a guide channel. The channel opens towards the interior of the filter element.

Advantageous embodiments and further developments of the filter element are also disclosed.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure.

DETAILED DESCRIPTION OF THE INVENTION

Figure 1:
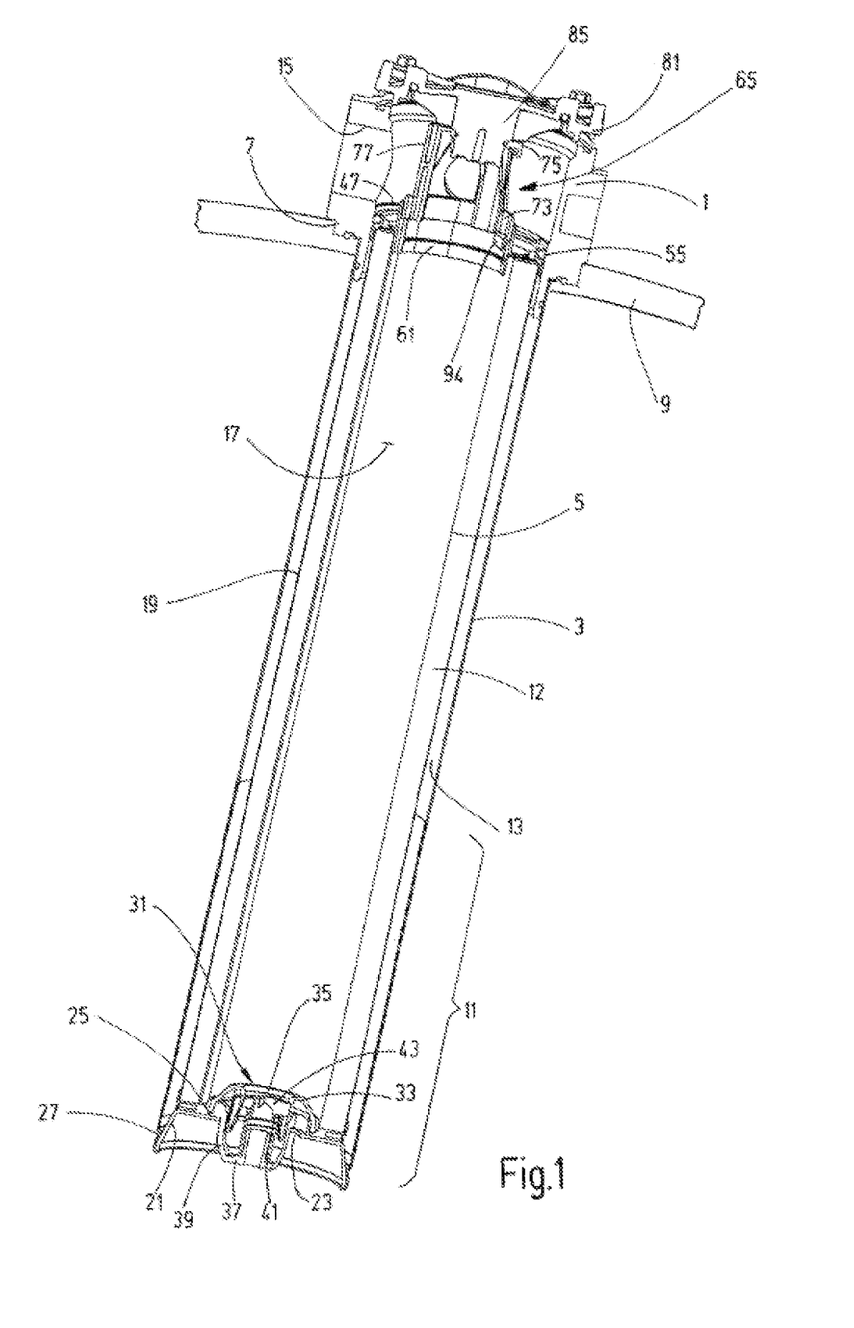
FIG. 1 is a perspective view in section of a filter device according to a first exemplary embodiment of the invention, not drawn to scale.

With reference to the attached drawings, the invention is described by way of example for tank-installation filter devices. In a first exemplary embodiment, a housing head 1, which in conjunction with an enclosure 3 forms the filter housing for receiving a filter element 5, is attached to an upper opening 7 in a tank 9, which is shown only schematically. The rest of the tank, holding a fluid supply, is not shown. As usual in the case of tank installation filter devices, the enclosure 3 is provided, at least in a lower length area 11, which is below the normal liquid level in the tank, with a perforation through which filtrate emerges from the chamber 13 in the filtering process. Chamber 13 is located between the outside of the filter material 12 of the filter element 5 and the enclosure 3 and forms the clean side during the filtration process. The inflow of the unfiltered matter is routed from a fluid inlet 15 in the housing head 1 to the inner filter cavity 17, which is encompassed by the filter material 12.

Figure 2:
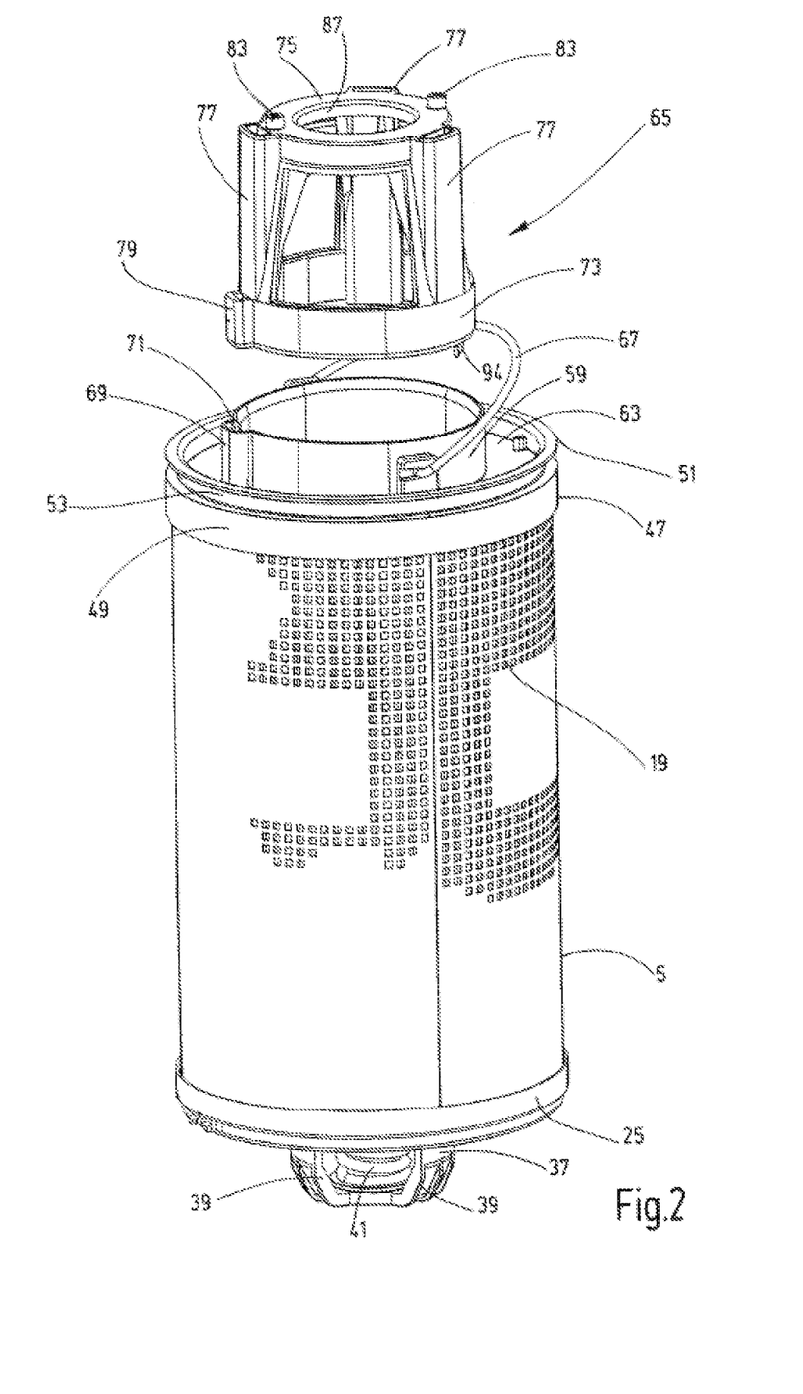
FIG. 2 is an exploded perspective view of the filter element and the positioning device of the first exemplary embodiment of the filter device.
Figure 3:
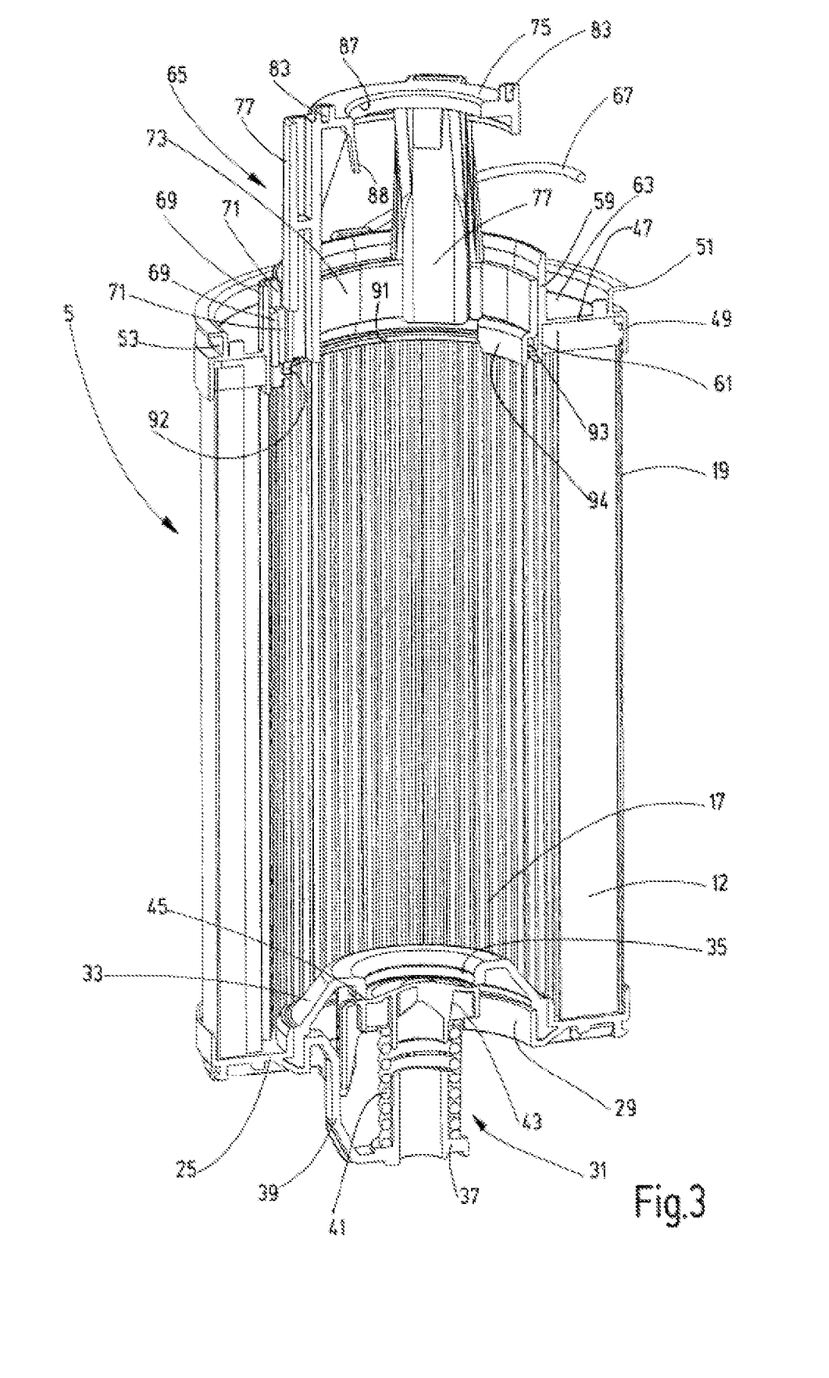
FIG. 3 is a perspective view in section of the filter element and the positioning device of FIG. 1 in engagement, taken along a central sectional plane.
Figure 4:
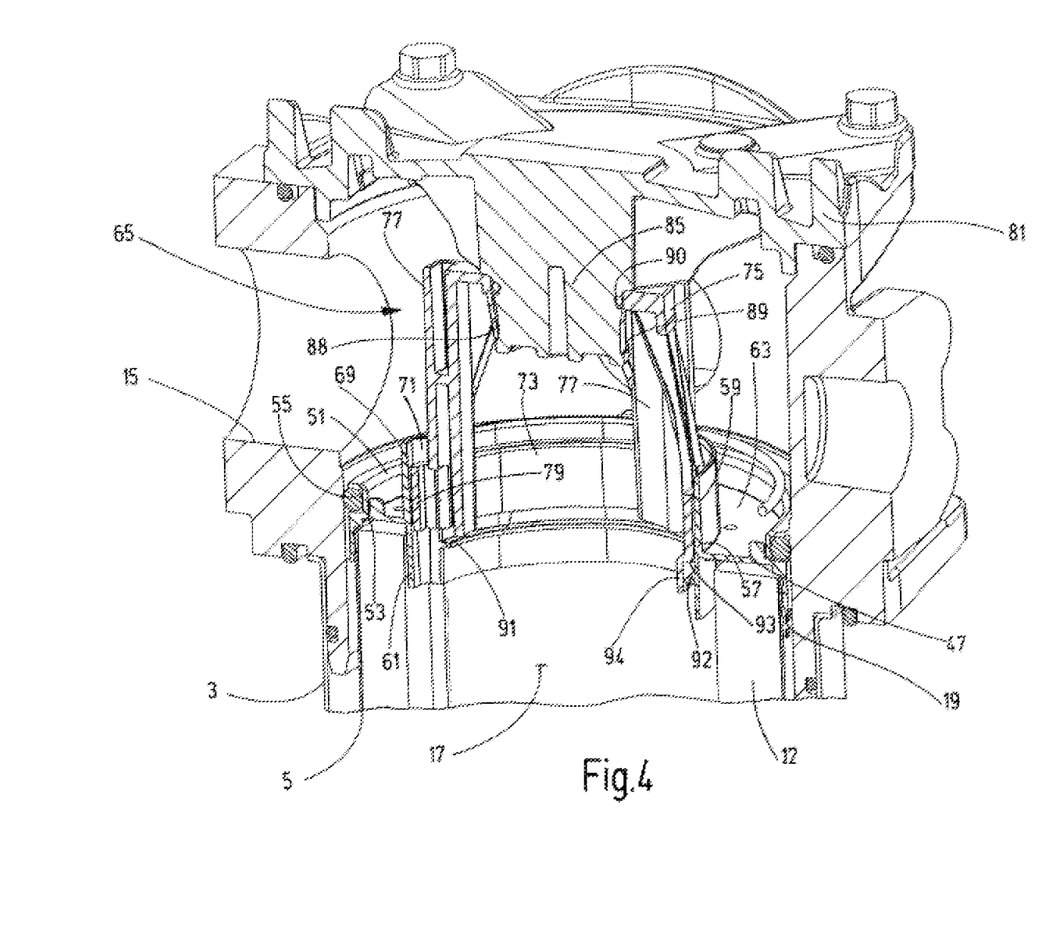
FIG. 4 is an enlarged, partial perspective view in section of the head part of the first exemplary embodiment, wherein the functional position is shown, in a centrally extending, vertical sectional plane.

As can be seen more clearly in FIGS. 2 to 4, a fluid-permeable support tube 19 is arranged as a sheath of the filter material 12 on the outside of the filter material 12, when the fluid flows through the filter material 12 from the inside to the outside during the filtering process.

The enclosure 3, as shown in FIG. 1, has a bottom part 21 at the lower end of the perforated part 11. The bottom part has the shape of a shell that is open towards the bottom. In the bottom of the shell there is a centrally located opening 23. The contact area for an end cap 25 located at the lower end of the filter material 12 of the filter element 5 forms the top of the bottom part 21. At the outer circumference, the bottom part 21 is firmly connected to the lower end of the enclosure 3 via a flange 27.

As best shown in FIG. 3, the lower end cap 25 has a centrally located inner passageway 29 leading to the inner chamber 17, which is normally closed by a bypass valve 31. The bypass valve 31 has a two-piece valve housing, having an upper housing part 33, which extends in the form of a bell into the interior 17 and which has a central opening 35 at the upper end. While this bell forms a valve body 33, which is clipped to the end cap 25, a second valve body 37 is formed integrally with the end cap 25 and has a ring of spaces disposed between retaining webs 39 arranged at intervals, which retaining webs form the holder of a closing spring 41 of the bypass valve 31. The closing spring pre-stresses a closing body 43 for sealing engagement with a seat surface 45 at the edge of the opening 35 of the valve body 33, from which it can be lifted in a pressure-actuated manner.

The end cap 47 forming the apron for the upper end of the filter material 12 has an upwardly projecting outer ring 51 above its peripheral edge 49, which forms the apron for the filter material 12 and the support tube 19 resting thereon. The outer ring 51 has a circumferential, recessed annular groove 53 as a receptacle for a sealing ring 55 (FIG. 4). When the filter element 5 is inserted into the filter housing, cf. FIGS. 1 and 4, the sealing ring 55 forms the seal against the housing head 1. The end cap 47 has a central passage encompassed by a guide ring 57. An upper part 59 and a lower part 61 of the guide ring protrude on both sides of an abutment ring 63. At the underside of abutment ring 63, the facing frontal or axial end of the filter material 12 is attached. The guide ring 57 including its upper part 59 and its lower part 61 interacts with a positioning device 65 shown separately in FIG. 2. The guide ring 57, at its upper part 59 of, as shown in FIG. 2, has a handle bar 67 pivotally mounted and has a radially outwardly facing bulge 69 (FIGS. 2, 5 and 6), which encompasses an inner, axially extending guide channel 71, for the interaction with the positioning device 65.

The positioning device 65 has the form of a one-piece plastic body having a foot part formed by an insert ring 73 and an upper head ring 75 extending in a parallel plane to the insert ring 73. These rings are interconnected by three spacer webs 77 evenly distributed along the perimeter, the length of the spacer webs corresponds approximately to the diameter of the insert ring 73. As an engagement part that is in engagement with the guide channel 71 at the end cap 47 in the operative position (see FIGS. 3 and 4), the insert ring 73 of the positioning device 65, has, similar to the top part 59 of the guide ring 57 of the end cap 47, a bulge 79. Bulge 79 projects radially and forms an axially extending guide web, which in the operating position is fittingly guided in the guide channel 71. The axial length of the bulge 79 is smaller than the guide length available in the guide channel 71. The filter element 5 is rotatably positioned due to the engagement of the bulge 79 with the guide channel 71 of the end cap 47.

As can be seen most clearly from FIG. 4, the positioning device 65 is inserted between the housing head 1 and the end cap 47 of the filter element 5. To that end, the head ring 75 abuts abutment parts, which are located at a housing cover 81 forming the end part of the housing head 1. The housing cover 81 is detachably bolted to the remaining part of the housing head 1. Engagement parts 83 projecting at the top of the head ring 75, spaced apart from one another, engage with recesses in the housing cover 81 not shown, which leave a free radial play for the engagement parts 83. Further abutment parts are located at a cone body 85, which passes through the central opening 87 of the head ring 75. To this end, tongue-shaped latching parts 88, which originate from the edge of the opening 57 of the head ring 75, come into latching engagement with a circumferential notch 89 at the cone body 85. The head ring 75 is sealed against the cone body 85 using a sealing ring 90 seated at the inner circumference of the opening 87. The frictional connection between the sealing ring 90 and the cone body 85 forms a further immobilization of the head ring 75.

The bottom part of the lower end cap 25 forming an attachment point 21 at the enclosure 3, supports, as mentioned above and shown in FIG. 1, the filter element 5 against axial downwards movements. At the upper end of the filter element 5, a floating bearing permitting upward motion is formed at the end cap 47 via the sealing ring 55. To limit this motion to a desired axial play, a radially projecting rib 91 is formed at the inside of the lower part 61 of the guide ring 57 of the end cap 47. The upper side of rib 91 forms a boundary surface 92. This surface 92 acts as an abutment surface in conjunction with a stepped boundary shoulder 93, which is formed in lobe-shaped extension 94 extending over the rib 91. Extension 94 extends away from the lower edge of the insert ring 73 downwards into the interior 17. The clearance between the rib 91 and the shoulder 93 limits the possible axial play of the floating bearing at the end cap 47, which can be used to compensate any length tolerances of the filter element 5.

Figure 6:
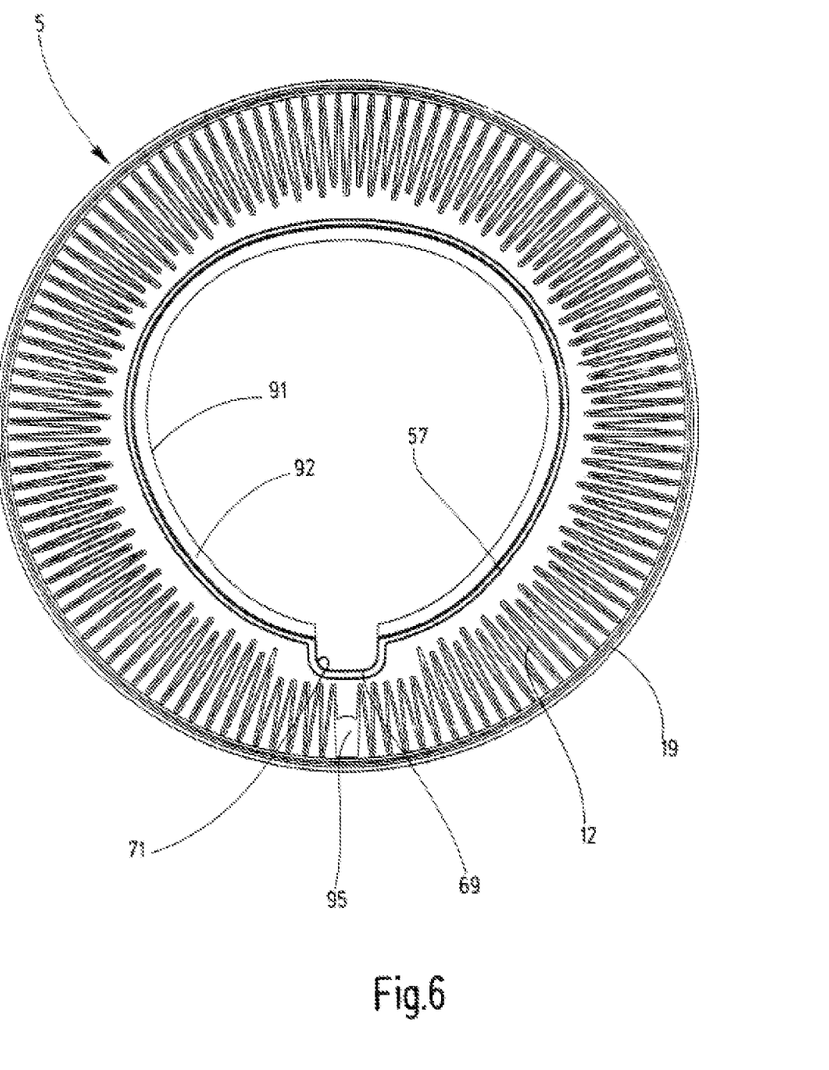
FIG. 6 is an end view in section of the filter element of the device of FIG. 1.

As is most clearly shown in FIG. 6, the outer periphery of the filter element 5 formed by the support tube 19 is circular, while the inner circumference of the inner components of the end cap 47, i.e., the guide ring 57 at the underside 61 of which the rib 91 with the boundary surface 92 is located, has the non-circular shape of a Reuleaux triangle.

Figure 5:
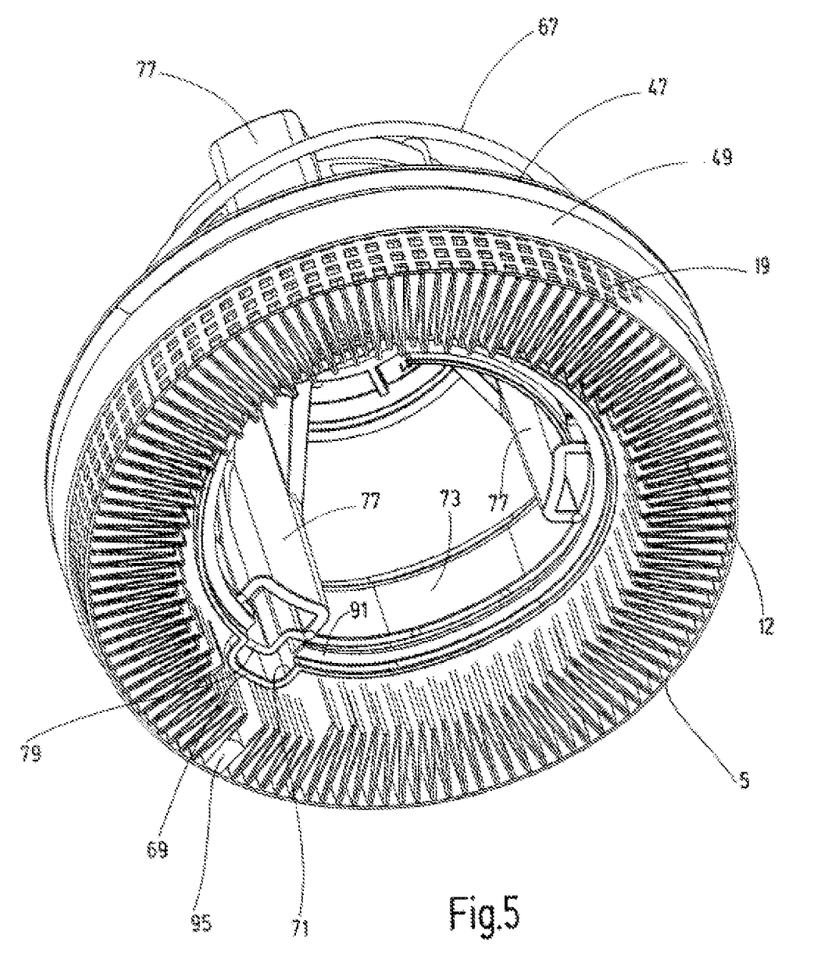
FIG. 5 is a perspective view in section of the filter element and the positioning device interacting therewith of FIG. 1, viewed from below, along a horizontal sectional plane.

As shown in FIGS. 5 and 6, in this kind of shaping, the bulge 69 encompassing the guide channel 71 is oriented towards the assigned end of the connecting longitudinal seam 95, which is used to interconnect the ends of the web of the pleated filter material 12, for example a mesh pack. As shown in FIG. 6, the pleat height of the filter material web is reduced in the area of the longitudinal seam 95 formed by welding or gluing. Unlike the upper end cap 47, all components of the lower end cap 25 have a circular cylindrical outer and inner circumference.

Figure 7:
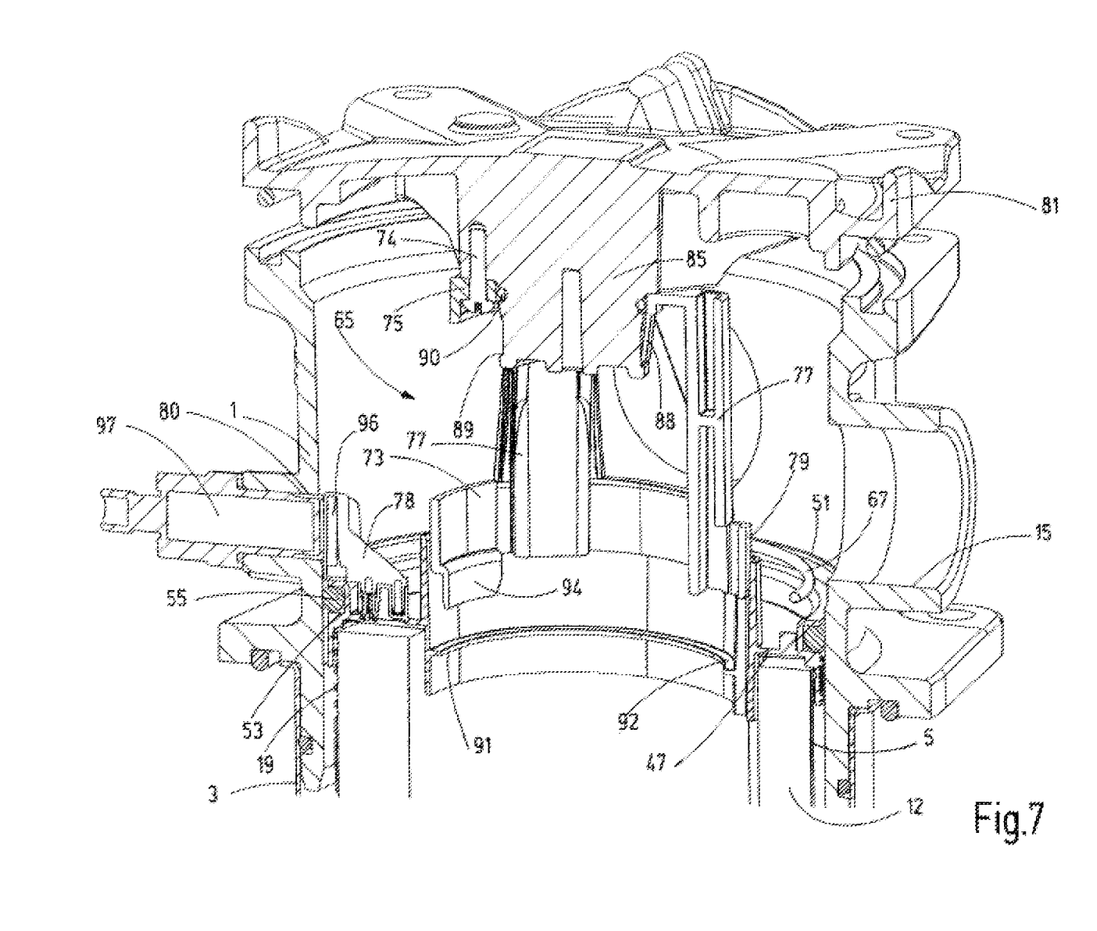
FIG. 7 is an enlarged perspective view in section of the head part of a filter device according to a second exemplary embodiment of the invention, wherein the functional position is shown, along a centrally extending, vertical sectional plane.

FIG. 7 shows the area of the housing head 1 of a second exemplary embodiment of the filter device according to the invention. FIG. 7 shows housing cover 81 forming the end part in a position separate from the housing head 1. Deviating from the first exemplary embodiment, the head ring 75 of the positioning device 65 is not only attached by the frictional connection at the sealing ring 90 and the engagement of the latching parts 88 with the notch 89 of the cone body 85, but by at least one fastening bolt 74. Bolt 74 passes through the head ring 75 from below and attaches the cone body 85 to the top of the head ring 75, at which no protruding engaging parts 83 are provided, and thus, determines the rotational position of the positioning device 65.

Another difference from the first exemplary embodiment is that a holder 78 for a tag 96 forming a passive transponder is integrally formed at the top end of the upper end cap 47 of the filter element 5. The tag 96 in the form of a flat chip is arranged in the holder 78 at a small distance from the wall of the housing head 1 encompassing the end cap 47, preferably exchangeably. In the wall, a sensor opening 80 is formed in such a position that an RFID sensor 97 bolted therein is aligned with the tag 96 when the filter element 5 is in the functional position predetermined by the positioning device 65, in which position the sensor 97 can scan the data stored in the tag 96.

Figure 8:
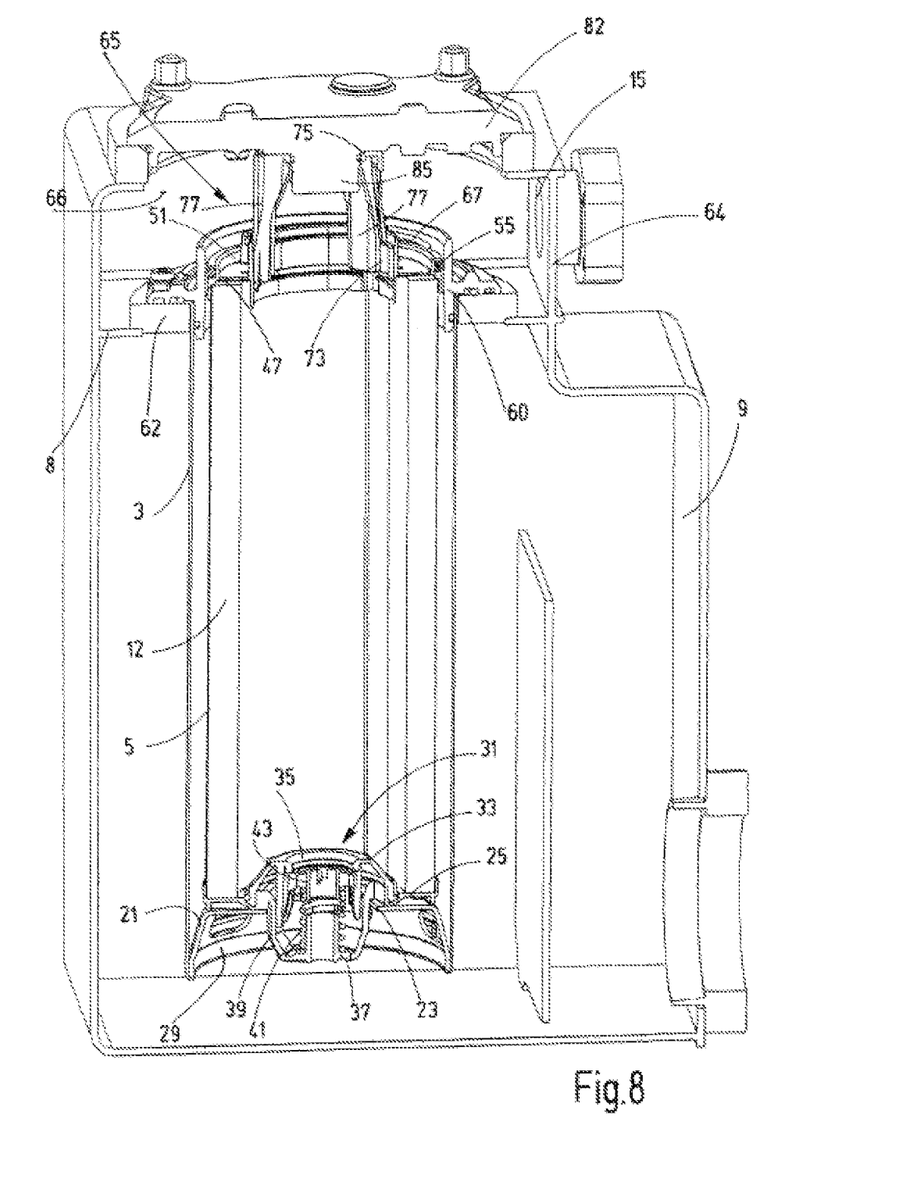
FIG. 8 is a perspective view in section of a filter device according to a third exemplary embodiment of the invention, along a vertical sectional plane.

FIG. 8 illustrates a third exemplary embodiment, in which, in the functional position of the filter element 5, the upper end cap 47 is not sealed against a housing head 1 by the sealing ring 55 located at its outer ring 51, but against the inside of an annular body 60, which is part of the assigned tank 9. In conjunction with a support ring 62, the annular body 60 also forms the mount of the enclosure 3. The support ring 62 in turn is held by a wall part 8, which forms an intermediate wall at the upper area of the tank 9, which separates an upper tank casing 64 from the main chamber of the tank 9 below, into which the enclosure 3 extends. The tank attachment 64 forms the inflow chamber 66 for the supply of the unfiltered material via the fluid inlet 15 located at the tank attachment 64. In the absence of the housing head 1 having the housing cover 81, in this exemplary embodiment, the end part, which constitutes the abutment parts for the positioning device 65, is formed by a tank cap 82, which can be detachably mounted to the top of the tank casing 64 as a closure part of the inflow chamber 66.

While various embodiments have been chosen to illustrate the invention, it will be understood by those skilled in the art that various changes and modifications can be made therein without departing from the scope of the invention as defined in the claims.

The invention claimed is:

1. A filter device, comprising:
an enclosure having a detachable housing end part;
a replaceable filter element being held in the enclosure and having a filter material extending between first and second end caps, the first end cap having a positioning element with a guide channel opening toward an interior of the filter element and having a guide ring on an inside thereof projecting on both sides of and beyond an abutment ring of the first end cap, one free axial end of the filter material being attached to the abutment ring, an outer circumference of the guide channel being attached to the guide ring; and
a positioning device being connected to the housing end part and being arranged between the housing end part and the first end cap and positioning the filter element within the enclosure at least in a circumferential direction, the positioning device including a guide web engaging the guide channel and forming an annular body bearing an insert ring at a foot end of the annular body and a head ring at a head end of the annular body spaced from the insert ring, the insert ring and the head ring being connected by the guide web and the head ring at least partially abutting the housing end part.

2. A filter device according to claim 1 wherein
the guide ring extends along an entire height of the guide channel.

3. A filter device according to claim 1 wherein
a housing head is attached to the enclosure, the positioning device being between a housing cover of the housing head and the first end cap with the housing cover forming the housing end part.

4. A filter device according to claim 3 wherein
the guide ring has an inwardly facing boundary surface in a direction of the interior of the filter element, the boundary surface interacting with a stepped boundary shoulder at the insert ring of the positioning device, the insert ring engaging in an operating state with the guide ring from a side of the housing head, a predetermined axial distance being between the boundary shoulder and the boundary surface.

5. A filter device according to claim 4 wherein
the insert ring engages the guide ring flush.

6. A filter device according to claim 3 wherein
the housing cover has abutment parts and is detachably mounted to the housing head.

7. A filter device according to claim 6 wherein
latching parts at the head ring of the annular body engage the abutment part of the housing cover axially mounting the positioning device at the housing head.

8. A filter device according to claim 6 wherein
a fastening bolt is between the head ring and the abutment parts of the housing cover or at a tank cap.

9. A filter device according to claim 6 wherein
the first end cap is concentric to the guide ring and has an outer ring receiving a first sealing ring, a second sealing ring being between the head ring of the positioning device and the abutment parts of the housing cover.

10. A filter device according to claim 1 wherein
the enclosure is fixedly coupled to the annular body mounted to a wall part of a fluid storage tank via a supporting ring; and
the positioning device is arranged between the first end cap and a tank cap forming the housing end part.

11. A filter device according to claim 1 wherein
the guide web projects outwardly at the insert ring toward the guide channel from the insert ring and has an installation length shorter than a guide length provided by the guide web within the guide channel recessed in the first end cap.

12. A filter device according to claim 1 wherein
a plurality of spacing webs extend between the insert ring and the head ring, the guide web bearing on an outside surface of the insert ring.

13. A filter device according to claim 12 wherein
three of the spacing webs extend between the insert ring and the head ring.

14. A filter device according to claim 1 wherein
outer circumstances of the filter element and the first end cap are circular-cylindrical; and
inner circumstances of the filter element and the first end cap form Reuleaux triangles.

15. A filter device according to claim 1 wherein
a connecting longitudinal seam of the filter material is aligned with the guide channel in the first end cap.

16. A filter device according to claim 1 wherein
the second end cap of the filter element has a bypass valve opening into an unfiltrate side in the interior of the filter element.

17. A filter device according to claim 16 wherein
the filter element is spaced at a radial distance from the enclosure forming a filtrate chamber therebetween, the filtrate chamber being perforated in an axial longitudinal area adjacent to the bypass valve.

18. A filter device according to claim 16 wherein
the second end cap is firmly connected to the enclosure forming an attachment point; and
the first end cap is attached to the enclosure by a floating bearing allowing axial movement therebetween.

19. A filter device according to claim 1 wherein
a tag is in a peripheral area of at least one of the first and second end caps and is readable by an RFID sensor located at a wall part of the enclosure encompassing the at least one of the first and second end caps.

20. A filter device according to claim 1 wherein
a tag is in a peripheral area of the first end cap and is readable by an RFID sensor in the housing end part.

* * * * *